(12) United States Patent
Vogel

(10) Patent No.: US 8,179,100 B2
(45) Date of Patent: May 15, 2012

(54) BATTERY CHARGER USING THE PHASE SHIFT BY A PAIR OF FORWARD CONVERTING CIRCUITS

(75) Inventor: Bernard J. Vogel, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 541 days.

(21) Appl. No.: 12/399,756

(22) Filed: Mar. 6, 2009

(65) Prior Publication Data

US 2010/0225280 A1 Sep. 9, 2010

(51) Int. Cl.
- *H02J 7/04* (2006.01)
- *H02M 1/084* (2006.01)
- *H02M 3/34* (2006.01)
- *H02M 5/00* (2006.01)

(52) U.S. Cl. ........ 320/145; 320/128; 320/135; 320/140; 320/141; 320/148; 320/157; 320/162

(58) Field of Classification Search .......... 320/128, 320/135, 140, 141, 145, 148, 157, 162
See application file for complete search history.

(56) References Cited

U.S. PATENT DOCUMENTS

| | | | |
|---|---|---|---|
| 4,575,670 A * | 3/1986 | Hignutt | 320/116 |
| 4,628,426 A | 12/1986 | Steigerwald | |
| 5,099,202 A | 3/1992 | Claydon et al. | |
| 5,117,347 A | 5/1992 | Rebello et al. | |
| 5,751,150 A * | 5/1998 | Rippel et al. | 324/537 |
| 5,754,028 A * | 5/1998 | Vezzini | 320/125 |
| 5,818,203 A * | 10/1998 | Narita | 320/128 |
| 6,204,630 B1 * | 3/2001 | James | 320/104 |
| 2004/0114397 A1 | 6/2004 | Liu et al. | |
| 2005/0046387 A1 | 3/2005 | Aker et al. | |
| 2005/0134220 A1 | 6/2005 | Brohlin et al. | |
| 2007/0103941 A1 | 5/2007 | Liu et al. | |

FOREIGN PATENT DOCUMENTS

| | | |
|---|---|---|
| EP | 0949751 A2 | 10/1999 |
| JP | 10052754 A | 2/1998 |
| JP | 10216936 A | 8/1998 |
| JP | 2000102251 A | 4/2000 |
| JP | 2002010644 A | 1/2002 |

\* cited by examiner

*Primary Examiner* — Patrick Assouad
*Assistant Examiner* — Steve T Chung
(74) *Attorney, Agent, or Firm* — Fletcher Yoder, P.C.

(57) ABSTRACT

A technique for dynamically adjusting an output voltage of forward converter circuits for a battery charging operation is provided. The technique allows for varying voltage at the charging battery by manipulating the duty cycles of two forward converter circuits. Method and systems allow for increasing synchronized duty cycles in a pair of forward converter circuits in response to a changing battery charge state that requires a higher voltage output then changing a phase shift between the duty cycles in response to further increases in output voltage demand. The methods and systems also allow for setting a phase shift between duty cycles in a pair of forward converter circuits based on battery rating and then altering pulse width in response to changing battery charge state.

20 Claims, 12 Drawing Sheets

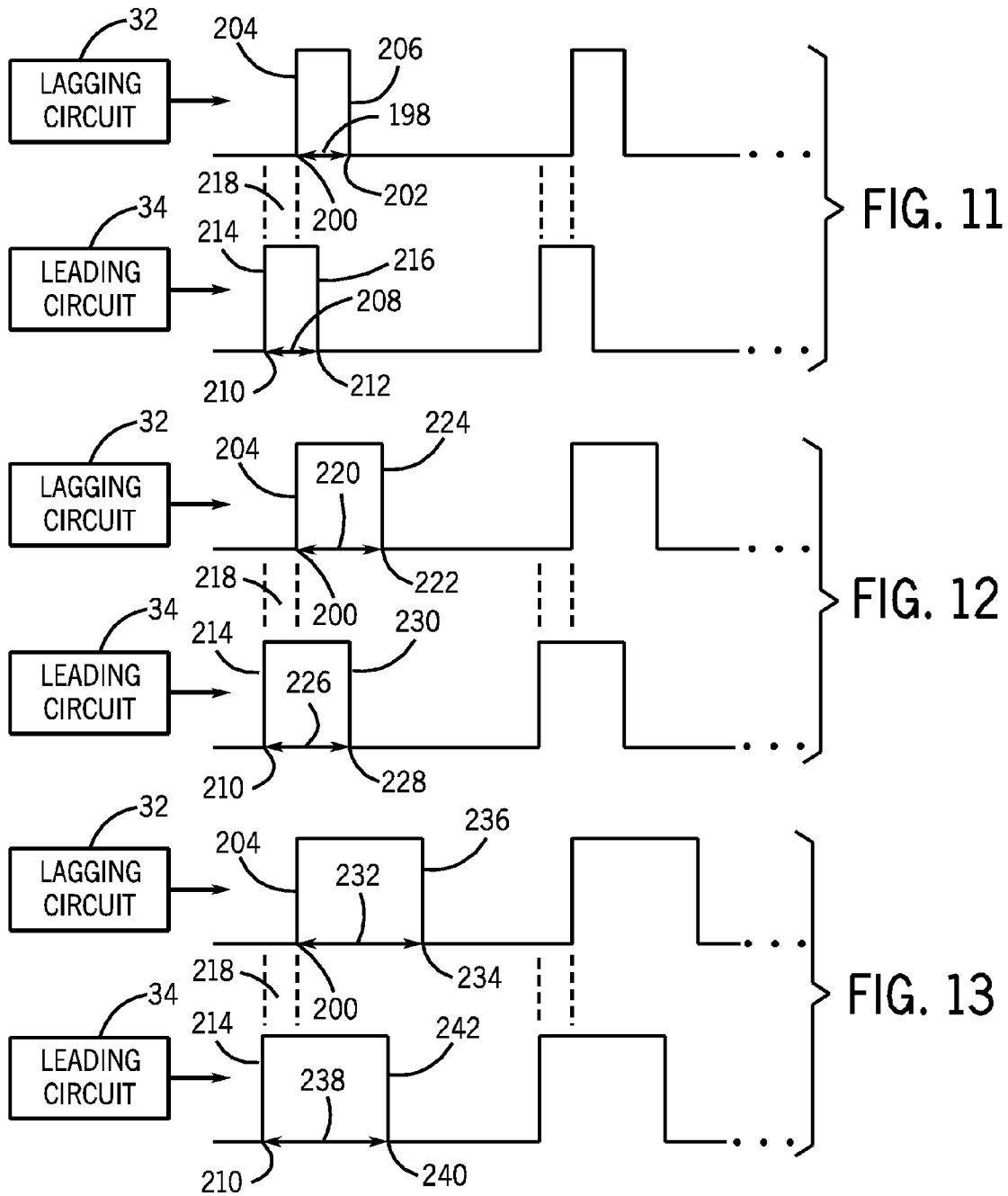

BATTERY CHARGER USING THE PHASE SHIFT BY A PAIR OF FORWARD CONVERTING CIRCUITS

BACKGROUND

The present disclosure relates generally to battery charging operations, and more particularly, to methods and systems for controlling a dual circuit inverter to dynamically adjust an output voltage of a battery charger.

Power supply circuits typically convert AC power to an output suitable for battery charging operations. The output power is provided at an appropriate voltage or current level and may be controlled and regulated according to an algorithm or regime based on the requirements of the battery being charged. Battery chargers are often required to charge a range of battery sizes and types used in a variety of types of applications, such as automotive, industrial, household, and so forth. For instance, battery chargers may need to be equipped to handle a range of battery voltages (e.g. 6V, 12V, 24V, and so forth) and a variety of battery chemistries (e.g. lead acid, lithium ion, nickel cadmium, and so forth).

The load requirements of the highest rated battery that a traditional charger is equipped to charge typically determine the thermal design of the power supply circuits, dictating the size and rating of components such as transformers, heat sinks, power devices, cooling fans and so forth. This generally results in a circuit with oversized components or a lack of efficiency when the battery charger is operating below the highest voltage it is equipped to handle. Accordingly, it is now recognized that there exists a need for circuits that can better handle the variety of load requirements a battery charger experiences without the inefficiencies of traditional designs.

BRIEF DESCRIPTION

The present disclosure provides a novel technique for dynamically adjusting an output voltage for a battery charging operation designed to respond to such needs. The technique allows for varying output voltage at the battery charger by manipulating the duty cycles of two forward converter circuits. In particular, the present disclosure provides methods and systems for increasing synchronized duty cycles in a pair of forward converter circuits in response to a changing battery charge state that requires a higher voltage output then changing a phase shift between the duty cycles in response to further changes in battery charge state requiring an even greater voltage output. The present disclosure also provides methods and systems for setting a phase shift between duty cycles in a pair of forward converter circuits based on battery rating and then altering pulse width in response to changing battery charge state. Present embodiments provide a controller designed to receive input signals and generate output pulse width modulation signals that control the duty cycle width and phase shift of the outputs of the forward converter circuits. Further, methods of accommodating for the time needed for the transformer core to reset via leading edge or lagging edge compensation are provided.

DRAWINGS

These and other features, aspects, and advantages of the present disclosure will become better understood when the following detailed description is read with reference to the accompanying drawings in which like characters represent like parts throughout the drawings, wherein:

FIG. 11 is a diagrammatical representation of exemplary waveforms illustrating out of phase duty cycles of two forward converter circuits operating below an upper limit in accordance with aspects of the present disclosure;

FIG. 12 is a diagrammatical representation of exemplary waveforms illustrating out of phase duty cycles of two forward converter circuits operating below an upper limit in accordance with aspects of the present disclosure;

FIG. 13 is a diagrammatical representation of exemplary waveforms illustrating out of phase duty cycles of two forward converter circuits operating at an upper limit in accordance with aspects of the present disclosure;

DETAILED DESCRIPTION

Figure 1:
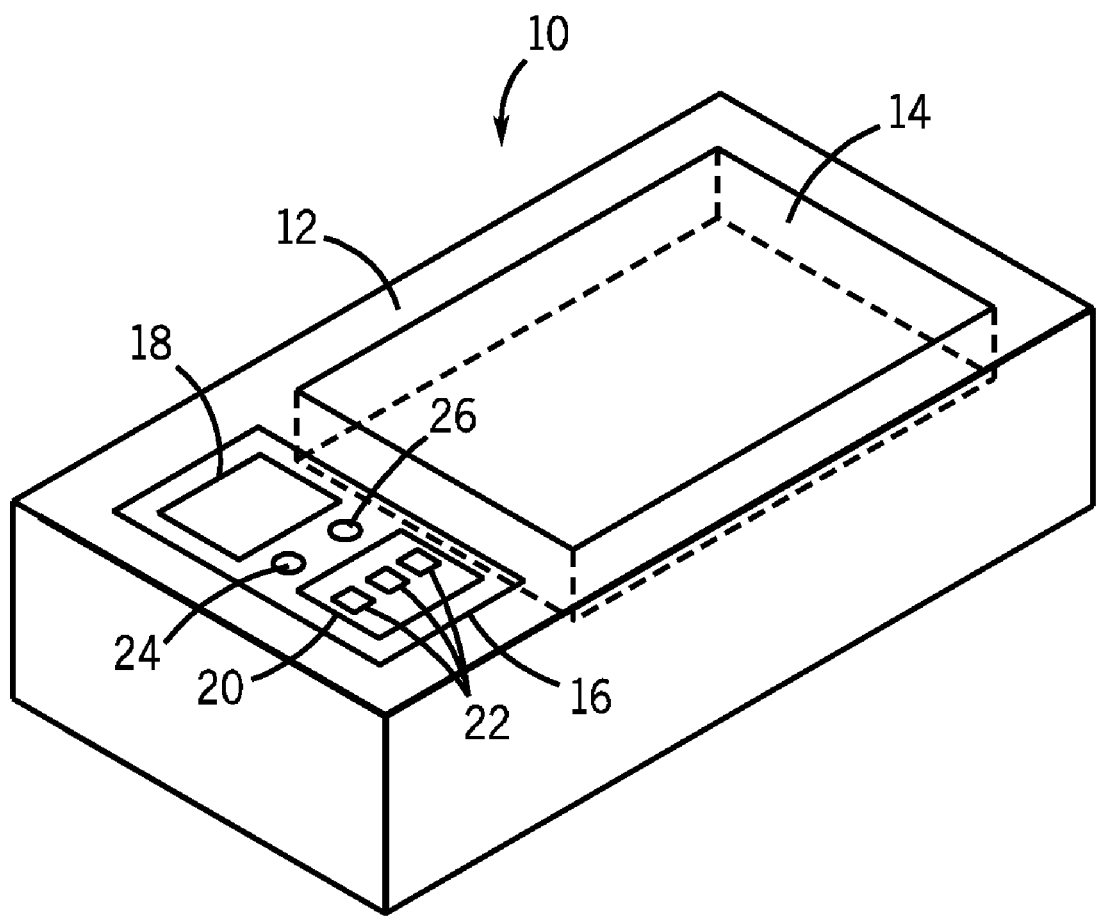
FIG. 1 is a perspective view of an exemplary battery charger power supply unit in accordance with aspects of the present disclosure.

FIG. 1 illustrates an exemplary battery charger 10, which contains power supply circuitry in accordance with present embodiments. The battery charger 10 includes an outer housing 12 and a battery compartment 14 into which one or more batteries may be placed during a battery charging operation. An exemplary user interface 16 contains a display panel 18 through which the battery charger 10 may communicate information, such as charge status, to a user and a control panel 20 that may allow the user to manually input information regarding battery rating, type, and so forth. In the embodiment shown, the user may communicate this information via push buttons 22. In other embodiments, the means of conveying information about the battery could additionally be switches, keypads, and so forth. In yet other embodiments, information about the batteries, such as a type of battery, may be automatically detected. Further, in some embodiments, the battery charger 10 may contain one or more indicator lights 32, 34, which may indicate that the unit is on and ready to charge 24 or that a charge is occurring 26 via display color, blinking status, and so forth.

Figure 2:
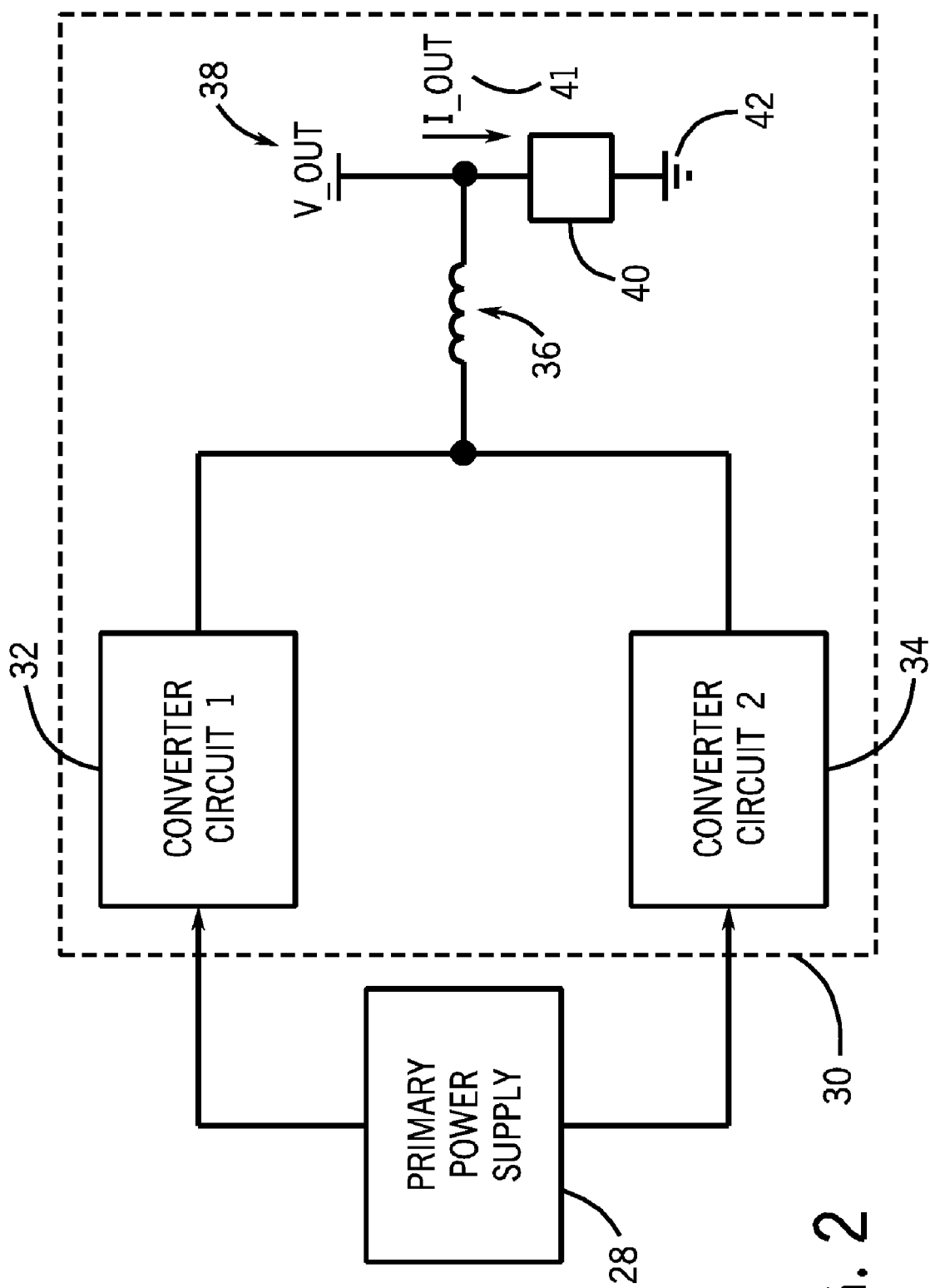
FIG. 2 is a block diagram of the components of a battery charger power supply in accordance with aspects of the present disclosure.

Internal components of the battery charger 10 convert power from a wall outlet or other source of AC or DC power to an output consistent with the voltage and/or current requirements of the battery, according to a charge algorithm or regime. FIG. 2 illustrates an exemplary block diagram of components that may be included in the battery charger power supply 10 in accordance with present embodiments. Specifically, FIG. 2 illustrates a primary power supply 28 which, in operation, outputs direct current (DC) to a battery charger power supply 30 comprising a first converter circuit 32 and a second converter circuit 34. The converter circuits 32, 34 operate to combine their respective outputs at a single node, which feeds into a filter inductor 36 that supplies an output voltage 38 (i.e. V_out) for the battery charging operation and a current 41 through a battery 40 to ground 42. In one embodiment, individual inductors may be utilized in place of the filter inductor 36. In other embodiments, the inductor 36 may have multiple windings used to combine the outputs of the two converter circuits 32, 34.

In one embodiment, the power supply 28 may be a DC source, such as a battery. In other embodiments, the power supply 28 may be a circuit that rectifies incoming alternating current (AC), converting it to DC. In the exemplary block diagram shown in FIG. 2, each of the converter circuits 32, 34 are connected to a single primary power supply 28. In other embodiments, the circuits 32, 34 may be powered from separate power supplies. In further embodiments, the circuits 32, 34 may be connected in parallel or series to the primary power supply 28 at the capacitors 44, 64 of the converter circuits 32, 34. In the embodiment where the circuits 32, 34 are connected in series with a single primary power supply 28, each converter circuit would only receive half the total voltage of the primary power supply 28, which may allow for the use of lower voltage components within the converter circuits 32, 34.

Figure 3:
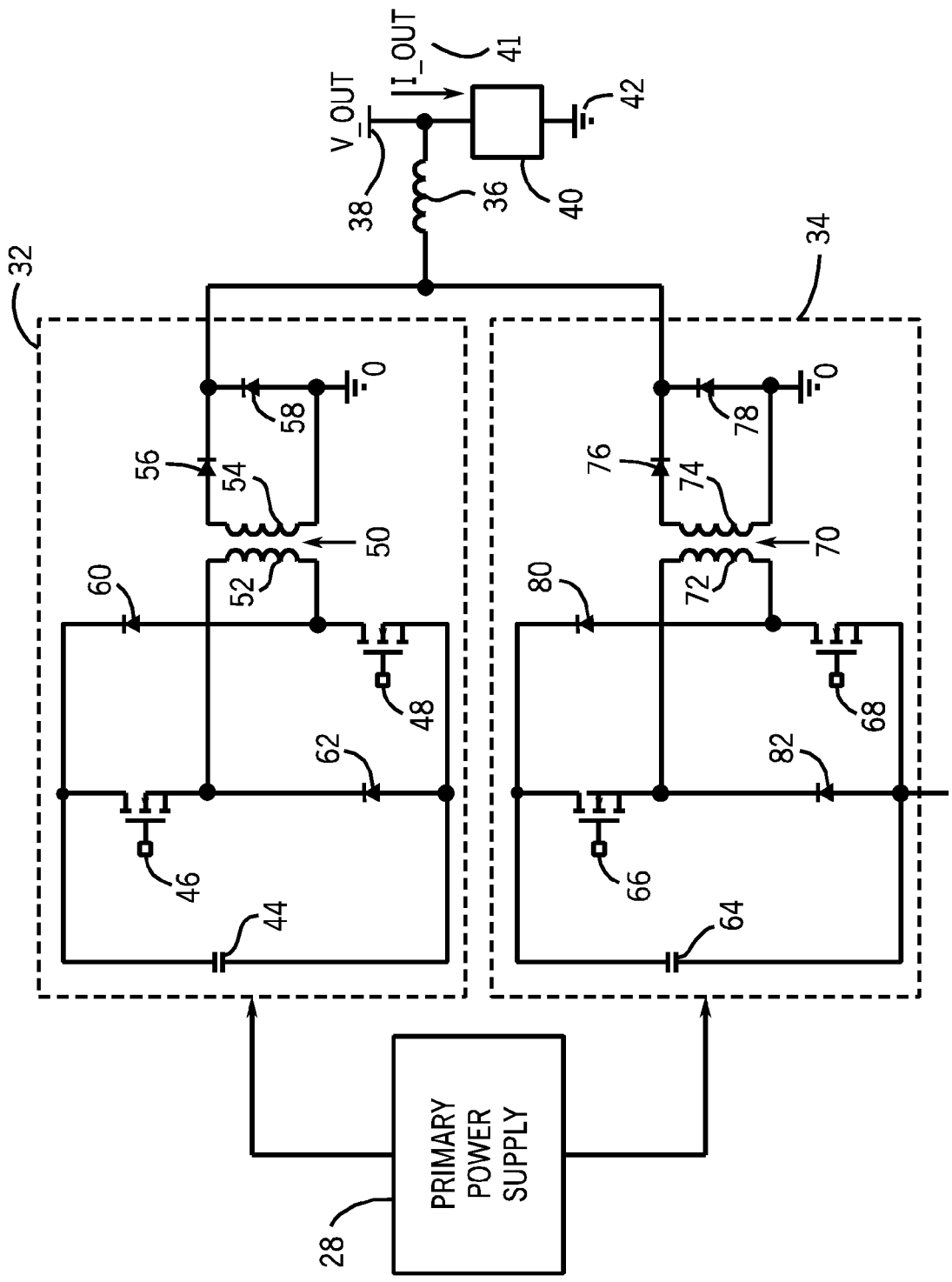
FIG. 3 is a circuit diagram illustrating an exemplary embodiment of the power supply comprising forward converter circuits in accordance with aspects of the present disclosure.

FIG. 3 is a circuit diagram illustrating one embodiment of the battery charger power supply 30 comprising the two forward converter circuits 32, 34 in accordance with aspects of present embodiments. As previously described, the primary power supply 28 provides DC power to the first converter circuit 32 and the second converter circuit 34. In the first inverter circuit 32, a voltage is first supplied across a capacitor 44. A pair of power semiconductor switches 46, 48 then chops the DC voltage and supplies it to a transformer 50 on the side of a primary winding 52 of the transformer 50. The transformer 50 transforms the chopped primary voltage to a secondary voltage and supplies it to a secondary winding 54 of the transformer 50. The secondary voltage is then rectified by rectifier diodes 56, 58 and supplied to the filter inductor 36. A set of diodes 60, 62 provide a free-wheeling path for the magnetizing current stored in the transformer 50 to flow when the pair of semiconductor switches 46, 48 turn off.

Similarly, in the second inverter circuit 34, a voltage is first supplied across a capacitor 64. A pair of power semiconductor switches 66, 68 then chops the DC voltage and supplies it to a transformer 70 on the side of a primary winding 72 of the transformer 70. The transformer 70 transforms the chopped primary voltage to a secondary voltage and supplies it to a secondary winding 74 of the transformer 70. The secondary voltage is then rectified by rectifier diodes 76, 78 and supplied to the filter inductor 36 across a node. A set of diodes 80, 82 provide a free-wheeling path for the magnetizing current stored in the transformer 70 to flow when the pair of semiconductor switches 66, 68 turn off. The combined rectified secondary voltage is supplied to the battery charger power supply output 38 and current flows through the battery 40. In other embodiments, the forward converter circuits 32, 34 may include additional components or circuits, such as snubbers, voltage clamps, resonant "lossless" snubbers or clamps, gate drive circuits, pre-charge circuits, pre-regulator circuits, and so forth. Further, as previously noted, the forward converter circuits 32, 34 may be arranged in parallel or in series in accordance with present embodiments, meaning that the capacitors 44, 64 may be connected in series or in parallel. Additionally, in further embodiments, the output of the first converter circuit 32 and the output of the second converter circuit 34 may be connected in series. In this embodiment, a single ground would be configured to support both circuits 32, 34, and the output of the diodes 56, 58 of the first converter circuit 32 would couple with the output of the diodes 76, 78 of the second converter circuit 34 before entering the inductor 36.

Figure 4:
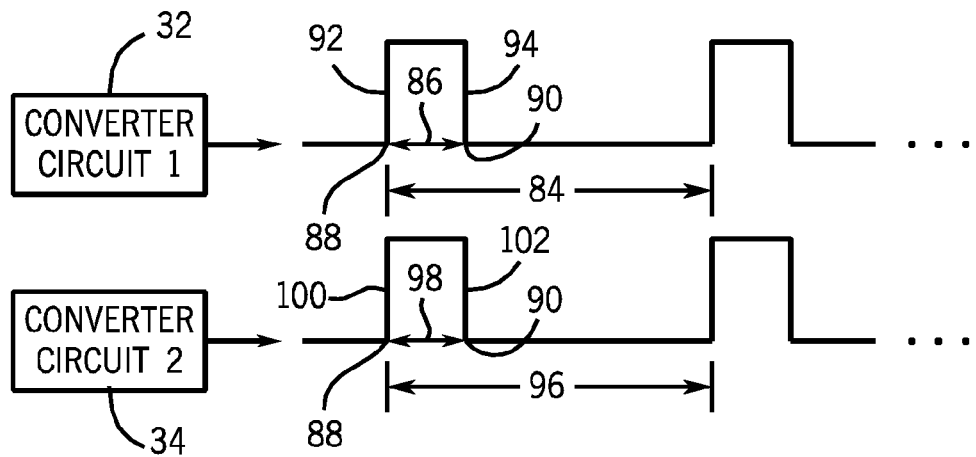
FIG. 4 is a diagrammatical representation of exemplary waveforms illustrating in phase duty cycles of two forward converter circuits in accordance with aspects of the present disclosure.

FIG. 4 is a diagrammatical representation of exemplary waveforms illustrating two possible in phase duty cycles of the two forward converter circuits 32, 34 in accordance with aspects of present embodiments. The semiconductor switches 46, 48 in the first converter circuit 32 are switched on and off during a switching period 84, defining an active period 86 for the circuit that begins at a starting time 88 and ends at a stopping time 90. The duty cycle or switch pulse width ratio for the first converter circuit 32 then becomes the active time 86 divided by the switching period 84. The active period 86 is defined by a leading edge 92 that begins the pulse and a lagging edge 94 that ends the pulse. In one embodiment, the pulse width ratio of the switches 46, 48 is limited to an upper limit of 50% of the switching period 84 so the core of the transformer 50 can naturally reset each cycle via the diodes 60, 62.

Similarly, the semiconductor switches 66, 68 in the second converter circuit 34 are switched on and off during a switching period 96, defining an active period 98 for the circuit that begins at the starting time 88 and ends at the stopping time 90. The duty cycle or switch pulse width ratio for the second converter circuit 34 then becomes the active time 98 divided by the switching period 96. The active period 98 is defined by a leading edge 100 that begins the pulse and a lagging edge 102 that ends the pulse. In one embodiment, the pulse width ratio of the switches 66, 68 is limited to an upper limit of 50% of the switching period 96 so the core of the transformer 70 can naturally reset each cycle via the diodes 80, 82. In the illustrated embodiment, the duty cycle for the first converter circuit 32 and the duty cycle for the second converter circuit 34 are equal and synchronous, dictating that the circuits 32, 34 are operating in phase. In such an arrangement, the load current is split between the two converter circuits 32, 34.

Figure 5:
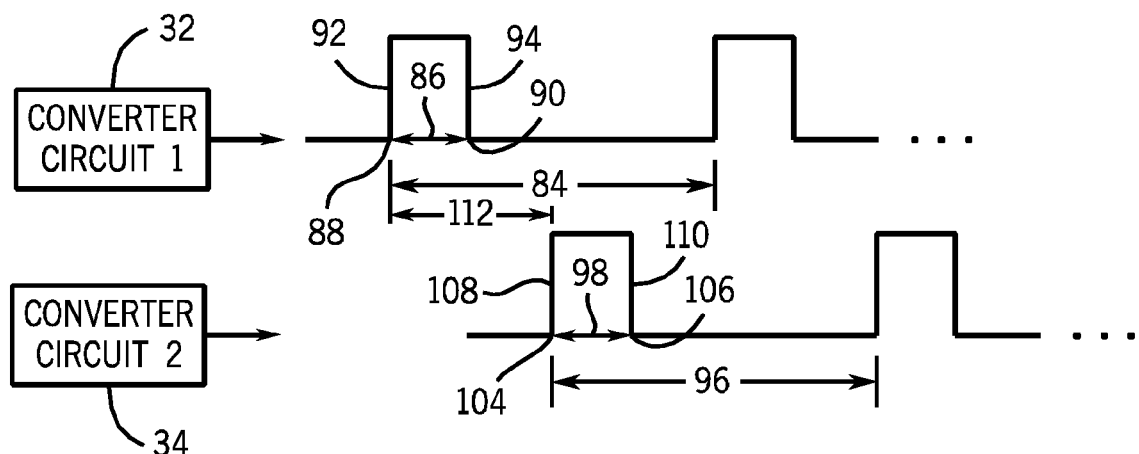
FIG. 5 is a diagrammatical representation of exemplary waveforms illustrating out of phase duty cycles of two forward converter circuits in accordance with aspects of the present disclosure.

FIG. 5 is a diagrammatical representation of exemplary waveforms illustrating two possible out of phase duty cycles of the two forward converter circuits 32, 34 in accordance with aspects of present embodiments. As previously described, the semiconductor switches 46, 48 in the first converter circuit 32 are switched on and off during a switching period 84, defining the active period 86 for the circuit that begins at the starting time 88 and ends at the stopping time 90. The duty cycle or switch pulse width ratio for the first converter circuit 32 then becomes the active time 86 divided by the switching period 84. The active period 86 is defined by the leading edge 92 that begins the pulse and the lagging edge 94 that ends the pulse.

Similarly, the semiconductor switches 66, 68 in the second converter circuit 34 are switched on and off during a switching period 96, defining an active period 98 for the circuit 34 as before. However, the active period 98 now begins at a later starting time 104 and ends at a later stopping time 106 that are distinct from the starting time 88 and stopping time 90 of the pulse of the first circuit 32. The duty cycle or switch pulse width ratio for the second converter circuit 34 is still the active time 98 divided by the switching period 96. However, the active period 98 is defined by a new leading edge 108 that begins the pulse and a new lagging edge 110 that ends the pulse. In the illustrated embodiment, the duty cycle for the first converter circuit 32 and the duty cycle for the second converter circuit 34 are equal but out of phase. In one embodiment, the pulse width ratios of the pair of switches 46, 48 in the first circuit and the pair of switches 66, 68 in the second circuit are each limited to an upper limit of 50% of the switching period 96 so the core of the transformer 70 can naturally reset each cycle. However, it may be possible to achieve an effective duty cycle of approaching 100% for the combination of the two circuits since the output from each of the respective transformers combine at a common node. In the illustrated embodiment, a transformer turns ratio, meaning the secondary turns 54, 74 divided by the primary turns 52, 72 may be less than the turns ratio of a transformer in an embodiment where the two converter circuits 32, 34 operate exclusively in phase. For an embodiment where the two circuits operate in phase, the pulse width ratio of the converter switches may be limited to 50%, meaning the combined outputs at 36 are in phase and can only supply voltage or power to the inductor 36 with a pulse width ratio of 50%. In the illustrated embodiment, with the two converter circuits 32, 34 operating out of phase and each limited to 50%, the duty cycle of the combined output at the inductor 36 can approach 100%. This means the transformer turns ratio for each converter circuit 32 or 34, may be reduced by approximately 50%. As is well known in the art, the transformer turns ratio is a function of the input voltage to the converter circuit 32 or 34, the output voltage 38, and the operating duty cycle to the input of the inductor 36.

Figure 6:
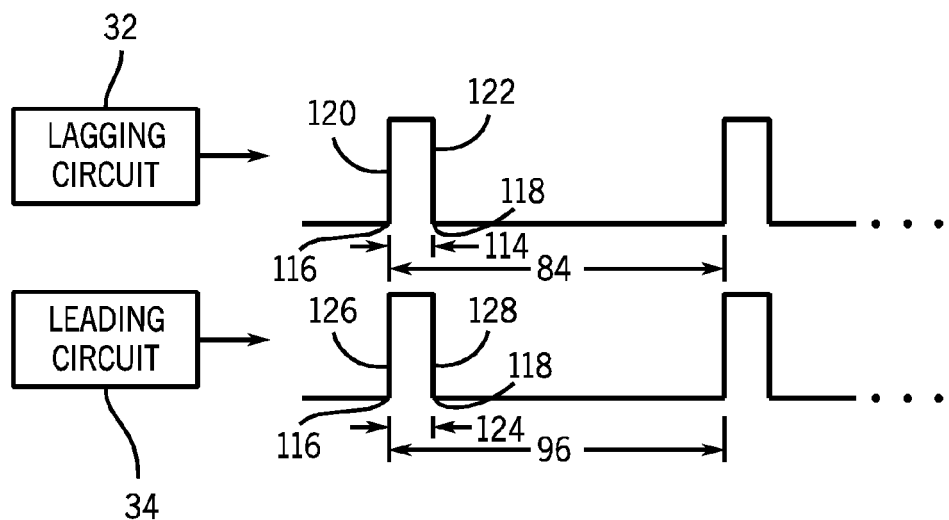
FIG. 6 is a diagrammatical representation of exemplary waveforms illustrating in phase duty cycles of two forward converter circuits operating below an upper limit in accordance with aspects of the present disclosure.
Figure 7:
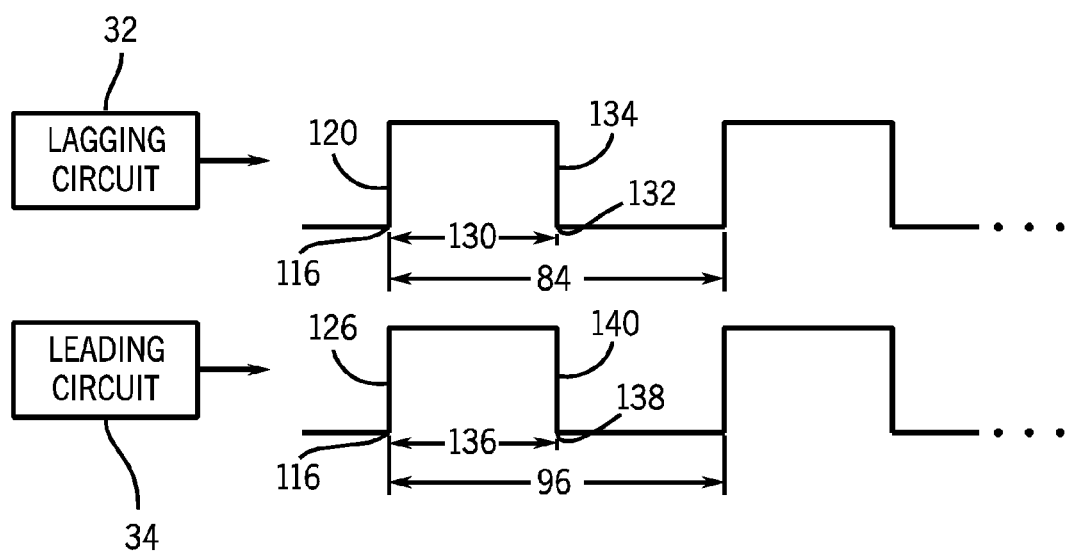
FIG. 7 is a diagrammatical representation of exemplary waveforms illustrating in phase duty cycles of two forward converter circuits operating at an upper limit in accordance with aspects of the present disclosure.
Figure 8:
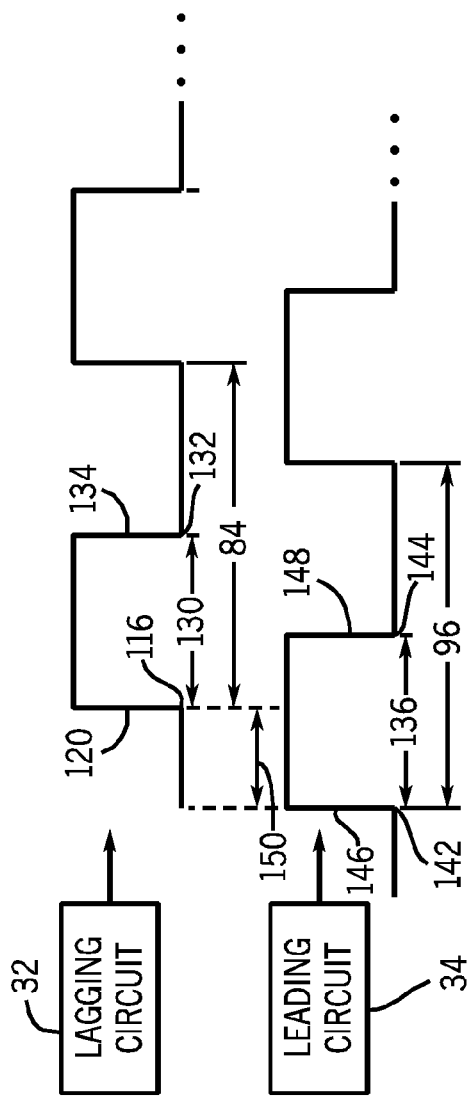
FIG. 8 is a diagrammatical representation of exemplary waveforms illustrating out of phase duty cycles of two forward converter circuits operating at an upper limit in accordance with aspects of the present disclosure.

FIGS. 6 through 8 illustrate exemplary waveforms representing outputs from the two forward converter circuits 32, 34 that may be produced during a control method in accordance with present embodiments. For example, in one embodiment, the first converter circuit 32 may be manipulated to act like a lagging circuit 32, and the second converter circuit 34 may be manipulated to behave like a leading circuit 34. During this control method, the two inverter circuits 32, 34 may operate in phase at low duty cycles. As a control loop senses and reacts to a condition at the battery charger output requiring greater output voltage from the inverter circuits 32, 34, the duty cycle may increase until it reaches an upper limit that may be defined by the time needed for the transformer core to reset. Beyond that point, the leading circuit 34 may be shifted out of phase and can continue shifting further out of phase until the two circuits 32, 34 are fully out of phase and an upper limit output voltage is being produced by the circuits 32, 34.

FIG. 6 illustrates an output of a first step of the control method. The lagging circuit 32 output waveform is formed when the semiconductor switches 46, 48 are switched on and off during a switching period 84, defining an active period 114 for the circuit that begins at a starting time 116 and ends at a stopping time 118. The duty cycle or switch pulse width ratio for the circuit becomes the active period 114 divided by the switching period 84. The active period 114 is defined by a leading edge 120 that begins the pulse and a lagging edge 122 that ends the pulse. Similarly, the leading circuit 34 output waveform is formed when the semiconductor switches 66, 68 are switched on and off during a switching period 96, defining an active period 124 for the circuit that begins at the starting time 116 and ends at the stopping time 118. The duty cycle or switch pulse width ratio for the circuit becomes the active period 124 divided by the switching period 96. The active period 124 is defined by a leading edge 126 that begins the pulse and a lagging edge 128 that ends the pulse. The pulse width of each converter circuit is initially less than the 50% upper limit as defined in one embodiment.

During this step of the control method, the duty cycle for the lagging circuit 32 and the duty cycle for the leading circuit 34 are equal and synchronous, dictating that the circuits are operating in phase. The circuits may operate in this manner during the initial part of the charge cycle when the battery voltage is low. During this phase of the control method, the circuits 32, 34 allow for large charging currents at a low voltage, providing a design that is more efficient than traditional methods since the two circuits share the load. By allowing for higher charging current for at least a portion of the charging cycle, desirable reductions in the total recharge time become possible. Additionally, the two circuits 32, 34 may operate in this mode for the entire charging cycle if the voltage of the battery being charged falls within the range of battery voltages (e.g. 6V or 12V) that can be charged with this mode of operation.

As the output voltage demand increases, the leading and lagging circuits 32, 34 synchronously increase their respective active periods until they reach an upper limit active period that may be defined by the time needed for the transformer core to reset as illustrated in FIG. 7. The lagging circuit 32 now gives rise to a pulse of an output waveform with an upper limit active period 130 defined by the same starting time 116 and a later stopping time 132 with respect to FIG. 6. The pulse then becomes defined by the same leading edge 120 and a later lagging edge 134 with respect to FIG. 6. Similarly, the leading circuit 34 now gives rise to a pulse of an output waveform with an upper limit active period 136 equal to the new upper limit active period of the lagging circuit 32, which is defined by the same starting time 116 and a later stopping time 138 with respect to FIG. 6. The pulse then becomes defined by the same leading edge 126 and a later lagging edge 140 with respect to FIG. 6.

Once the duty cycles of the circuits have increased to their respective upper limits 130 and 136 in response to a greater voltage demand, further increases in output voltage demand must be met via a phase shift of the leading circuit 34 as illustrated in FIG. 8. The active behavior of the lagging circuit 32 remains unchanged with respect to FIG. 7 while the leading circuit 34 shifts out of phase to accommodate the further increase in voltage demand. The pulse width of the active period 136 of the leading circuit 34 is defined by an earlier starting time 142 and an earlier stopping time 144 but remains unchanged in length. However, the location of the leading edge 146 of the leading circuit pulse is shifted with respective to the leading edge of the lagging circuit 120 by an amount 150 dictated by the magnitude of the output voltage demand. The leading circuit 34 will continue to shift further out of phase as needed until the two circuits meet the output voltage demand or are fully out of phase, producing the upper limit of their collective voltage output.

The circuits may operate in the manner illustrated in this step of the control method during the latter part of the charge cycle when the battery voltage is high. Additionally, the circuits 32, 34 may operate in this manner for the entire charging cycle if the voltage of the battery being charged is high enough to require this mode of operation (i.e. for a 24V or 48V battery). During this phase of the control method, the circuits 32, 34 may operate at low charging currents and a high voltage, ensuring that even when the battery voltage nears a desired set point, it still continues to get charged to the desired level. Each circuit will then be carrying the full load, necessitating a decrease in charging current. FIGS. 6-8 illustrate one embodiment in which three of the many possible combinations of pulse width and phase shift amount are shown. In other embodiments, the two converter circuits 32, 34 continuously respond to output voltage demand by increasing and/or decreasing duty cycle and/or phase shift amount as needed.

The forward converter circuits 32, 34 use a natural transformer core reset mechanism where the magnetizing current can naturally flow through the free-wheeling diodes 60, 62 of the first converter circuit 32 and the free-wheeling diodes 80, 82 of the second converter circuit 32 during inactive periods of the switches of the first converter circuit 46, 48 and the switches of the second converter circuit 66, 68, to allow the transformer cores to reset, where the inactive period refers to the portion of each switching period that the respective circuit is not producing an output voltage. A method for allotting sufficient time for the transformer core to complete its natural reset cycle during phase shifting may need to be employed. In one embodiment, the leading circuit 34 may skip a pulse when the phase shift value is increasing or decreasing to reset to the proper phase shift. Outputs for other possible embodiments of such a method are illustrated by the exemplary waveforms in FIGS. 9 and 10.

Figure 9:
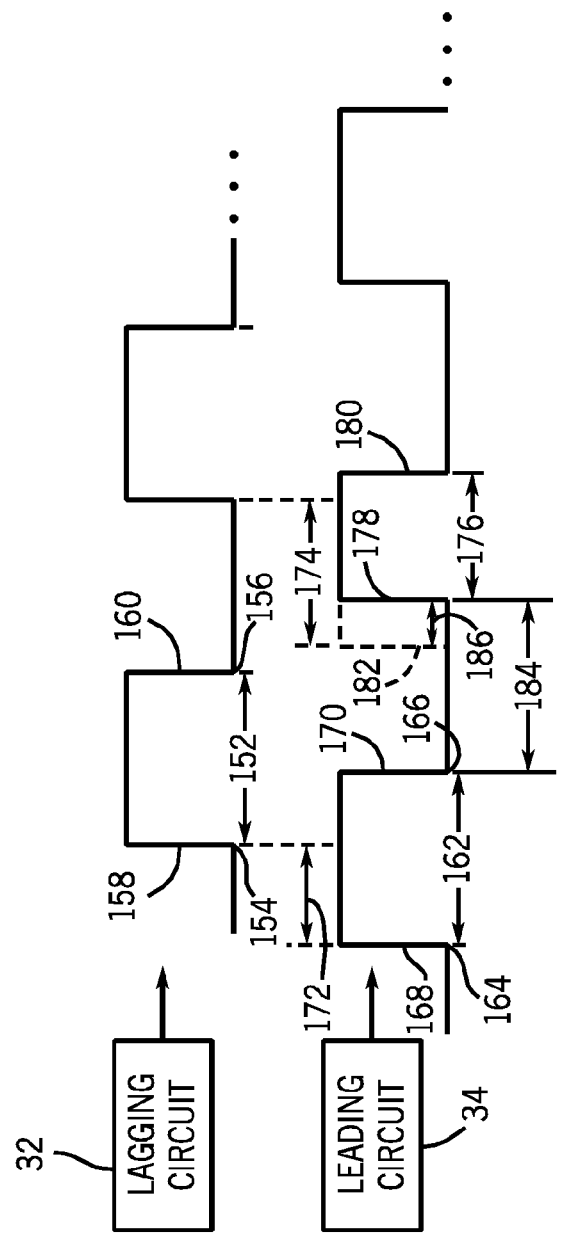
FIG. 9 is a diagrammatical representation of exemplary waveforms illustrating duty cycles of two forward converter circuits shifting out of phase via leading edge compensation in accordance with aspects of the present disclosure.

FIG. 9 is a diagrammatical representation of exemplary waveforms illustrating duty cycles of the two forward converter circuits 32, 34 shifting out of phase and compensating for the necessary transformer core reset time via leading edge compensation. In this embodiment, the lagging circuit 32 proceeds as previously described with respect to FIG. 7. The semiconductor switches 46, 48 are switched on and off, defining an active period 152 that begins at a starting time 154 and ends at a stopping time 156. The active period 152 is defined by a leading edge 158 that begins the pulse and a lagging edge 160 that ends the pulse, defining a duty cycle operating at an upper limit. The first pulse of the waveform of the leading circuit 34 illustrates that the circuit 34 was operating at an upper limit active period 162 that began at a starting time 164 and ended at a stopping time 166. The active period 162 was defined by a leading edge 168, a lagging edge 170, and an initial phase shift 172. However, the leading circuit 34 must again shift to a new phase shift value 174 to accommodate a further increase in voltage output demand at the battery charger output. To allow sufficient time for the transformer core to reset, some action must be taken to reduce the pulse width of the next pulse during the time that the phase shift is increasing. The embodiment in FIG. 9 shows a single reduced pulse width 176 formed by a new leading edge 178 and a new lagging edge 180, which reflect a delay in the desired leading edge 182 to allow for a full off period 184 for the transformer core to reset. The pulse is effectively shortened by a leading distance 186. Succeeding pulses would return back to the original upper limit pulse width 162 at the new phase shift value 174.

Figure 10:
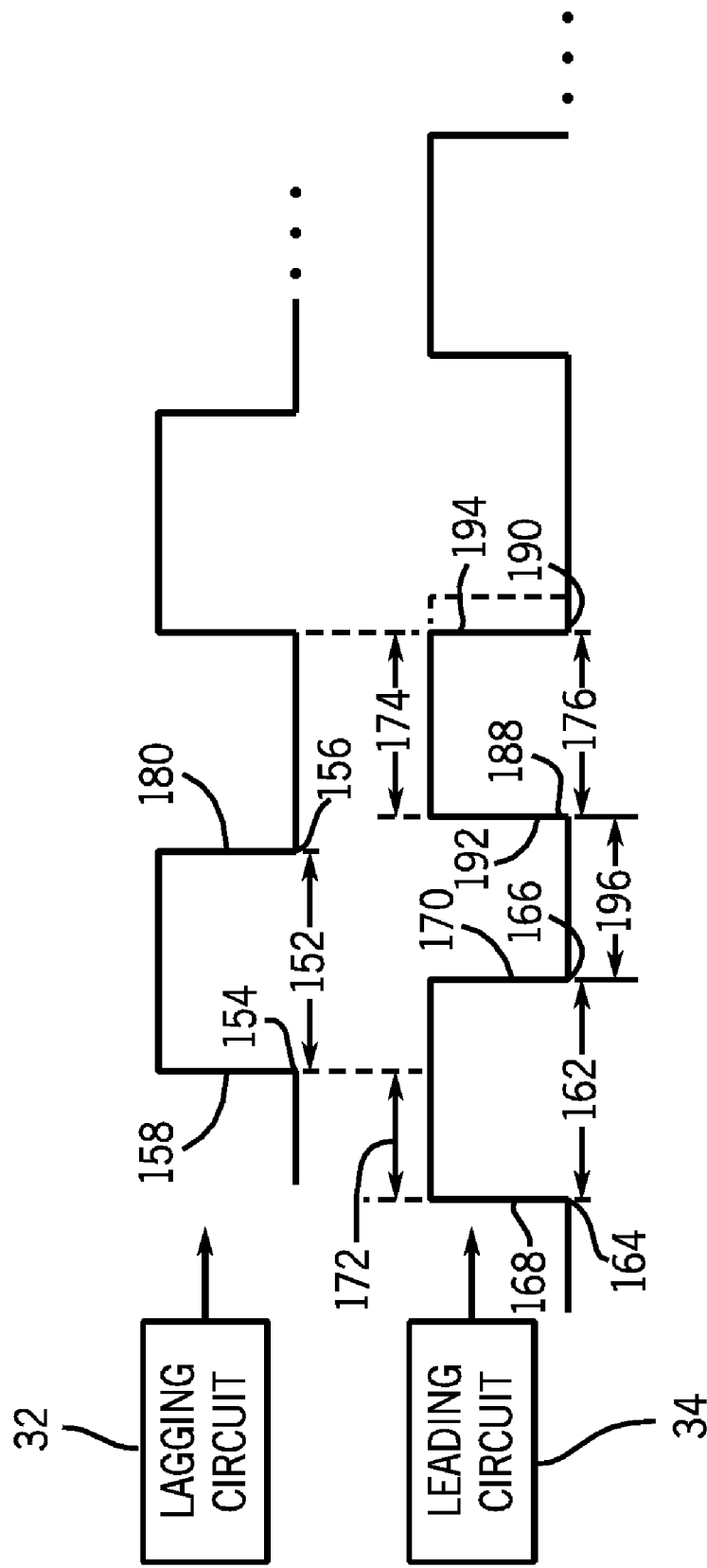
FIG. 10 is a diagrammatical representation of exemplary waveforms illustrating duty cycles of two forward converter circuits shifting out of phase via lagging edge compensation in accordance with aspects of the present disclosure.

FIG. 10 is a diagrammatical representation of exemplary waveforms illustrating duty cycles of two forward converter circuits shifting out of phase and compensating for the necessary transformer core reset time via lagging edge compensation. In this embodiment, the lagging circuit 32 proceeds as previously described with respect to FIG. 9. The semiconductor switches 46, 48 are switched on and off, defining an active period 152 that begins at a starting time 154 and ends at a stopping time 156. The active period 152 is defined by a leading edge 158 that begins the pulse and a lagging edge 160 that ends the pulse, defining a duty cycle operating at an upper limit. However, the leading circuit 168, which was operating at an upper limit of its duty cycle 162 and an initial phase shift 172, must again shift to a new phase shift value 174 to accommodate a further increase in voltage output demand from the battery. As previously stated, to allow sufficient time for the transformer core to reset, some action must be taken to reduce the pulse width of the next pulse during the time that the phase shift is increasing. The embodiment in FIG. 10 shows a single reduced pulse width 176 beginning at a new start time 188 and ending at a new stop time 190. The active period 176 is formed by a new leading edge 192 and a new lagging edge 194. In this embodiment, the desired start time of the leading edge 188 according to the new phase shift value 174 is not altered. Instead, an early lagging edge 194 is initiated to accommodate the need for adequate transformer core reset time. Even though the transformer was only allowed a shortened reset time 196 and the core was not fully reset before the onset of the next pulse, it was driven by a pulse of reduced width due to the early onset of the lagging edge 194 so that the peak flux in the transformer core at the end of the reduced pulse was no greater than it would be after a normal cycle when full reset was allowed to occur. Succeeding pulses would return back to the original upper limit pulse width 162 at the new phase shift value 174.

FIGS. 11 through 13 illustrate exemplary waveforms representing outputs from the two forward converter circuits 32, 34 that may be produced during an alternative control method in accordance with present embodiments. The first step of this control method would be to detect the type or nominal voltage of the battery to be charged (e.g., via automated detection or user input) and use this information to predetermine whether the converter circuits 32, 34 should be operated in phase, out of phase or partially out of phase based on the maximum voltage requirement of the battery; the phase shift would be set accordingly. For instance, for a low voltage battery (e.g. 6V) the control may be configured to operate the two converter circuits 32, 34 exclusively in phase. For high voltage batteries (e.g. 48V), the control may be configured to operate exclusively out of phase. In both of these cases, after the phase shift has been set, the duty cycles of the two converter circuits 32, 34 may be varied to provide the required voltage output. The control may also impose a limit on the maximum charging current for each mode. For instance, a low voltage battery may allow a higher maximum charging current than a high voltage battery.

FIG. 11 illustrates exemplary waveforms that may be generated in the first step of the control method. In this embodiment, the first converter circuit 32 may be manipulated to act like a lagging circuit 32, and the second converter circuit 34 may be manipulated to behave like a leading circuit 34. The first pulse of the lagging circuit 32 waveform has an active period 198 that begins at a starting time 200 and ends at a stopping time 202. The pulse width 198 is defined by a leading edge 204 and a lagging edge 206. The first pulse of the leading circuit 34 has an active period 208 that begins at a starting time 210 and ends at a stopping time 212. The pulse width 208 is defined by a leading edge 214 and a lagging edge 216. The starting time 210 of the first pulse of the leading circuit 34 precedes the starting time 200 of the first pulse of the lagging circuit 32, defining a phase shift 218. The battery charger 10 may operate in this way during the early portion of a battery charging cycle when the voltage requirement is low.

FIG. 12 illustrates exemplary waveforms that may be generated in the second step of the control method when the voltage demand at the battery has increased further later in the charge cycle. The first pulse of the lagging circuit 32 waveform has an increased active period 220 that begins at the same starting time 200 and ends at a later stopping time 222 with respect to FIG. 11. The pulse width 220 is defined by the same leading edge 204 and a later lagging edge 224 with respect to FIG. 11. The first pulse of the leading circuit 34 has an active period 226 that begins at the same starting time 210 and ends at a later stopping time 228 with respect to FIG. 11. The pulse width 226 is defined by the same leading edge 214 and a later lagging edge 230 with respect to FIG. 11. As in FIG. 11, the starting time 210 of the first pulse of the leading circuit 34 precedes the starting time 200 of the first pulse of the lagging circuit 32 by a set amount, maintaining the phase shift 218.

FIG. 13 illustrates exemplary waveforms that may be generated in the third step of the control method when the voltage demand at the battery has increased even further even later in the charge cycle with respect to FIG. 12. The first pulse of the lagging circuit 32 waveform has a further increased active period 232 that begins at the same starting time 200 and ends at a later stopping time 234 with respect to FIG. 12. The pulse width 232 is defined by the same leading edge 204 and an even later lagging edge 236 with respect to FIG. 12. The first pulse of the leading circuit 34 has an active period 238 that begins at the same starting time 210 and ends at an even later stopping time 242 with respect to FIG. 12. The pulse width 238 is defined by the same leading edge 214 and an even later lagging edge 242 with respect to FIG. 12. As in FIGS. 11 and 12, the starting time 210 of the first pulse of the leading circuit 34 precedes the starting time 200 of the first pulse of the lagging circuit 32 by a set amount, maintaining the phase shift 218. As noted above, in other embodiments, the phase shift and/or the pulse width may be manipulated to control output under certain circumstances.

Figure 14:
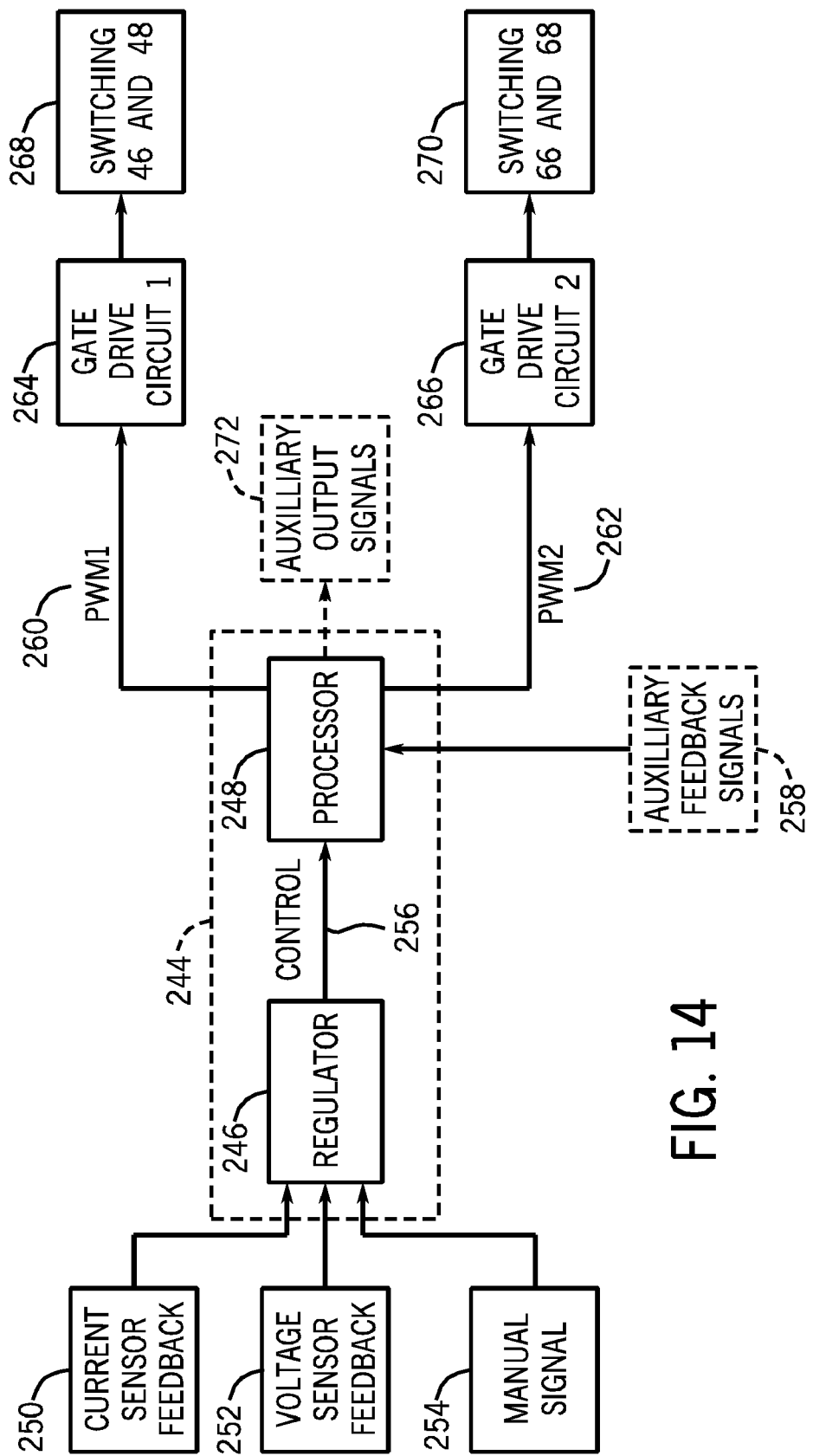
FIG. 14 is a block diagram illustrating exemplary processing logic that may be used to control the pulse width modulation of the battery charger power supply output in accordance with aspects of the present disclosure.

FIG. 14 is a block diagram illustrating exemplary processing logic that may be used to control the pulse width modulation of a power supply output. In accordance with aspects of the present embodiments, in the illustrated embodiment, a controller 244 comprising a regulator 246 and a processor 248 controls switching of forward converter circuits (e.g. forward converter circuits 32, 34) to achieve the desired voltage output at the charging battery. In one embodiment, the controller 244 may use feedback information to prevent the converter circuits 32, 34 from operating continuously in a full or partially phase shifted manner. Additionally, the controller 244 may take other actions to protect or prolong the life of the converter circuits 32, 34, such as reducing the output load current when operating beyond a certain time limit in a phase shift mode. These actions could be taken to prevent the two inverter circuits 32, 34 from operating for an excessive amount of time in a phase shifted mode at high currents, in the event of some abnormal dynamic load requirement at the battery. The controller 244 may also prevent the converter circuits 32, 34 from operating in a phase shifted mode if the output current is greater than some defined level.

The regulator 246 is configured to receive multiple inputs regarding the desired and actual output voltage, current, power, and so forth. For instance, the regulator 246 may receive feedback from a current sensor 250 and/or voltage sensor 252 at the battery being charged. Additionally, the regulator 246 may receive a manual input 254 from push buttons, a user interface, voice command, and so forth, regarding a desired setpoint or output. The regulator 246 may then generate an output control signal 256 based on its inputs. In one embodiment, the regulator 246 may include an error amplifier and compensation network and may be implemented with discrete circuits or software algorithms within the processor 248 or controller 244. The processor 248 may receive auxiliary feedback or input signals 258 such as temperature feedback, monitoring signals, control signals, and so forth. The control signal 256 is also received by the processor 248 and is used to set the required pulse width modulation (PWM) signals, PWM1 260 and PWM2 262. The individual PWM signals 260, 262 may include pulse width and phase shift values as dictated by the output demand of the system. The two PWM outputs 260, 262 are connected to two gate drive circuits 264, 266 to provide the necessary gate drive signals to drive the switching of the first converter circuit 268 and the switching of the second converter circuit 270. In certain embodiments, the processor 248 may output additional auxiliary signals 272, such as analog or digital outputs for monitoring and control of aspects of the battery charger power supply. Auxiliary signals 272 may include fan control signals, pre-charge relay signals, timing signals for other power circuits such as a pre-regulator circuit, and so forth.

Figure 15:
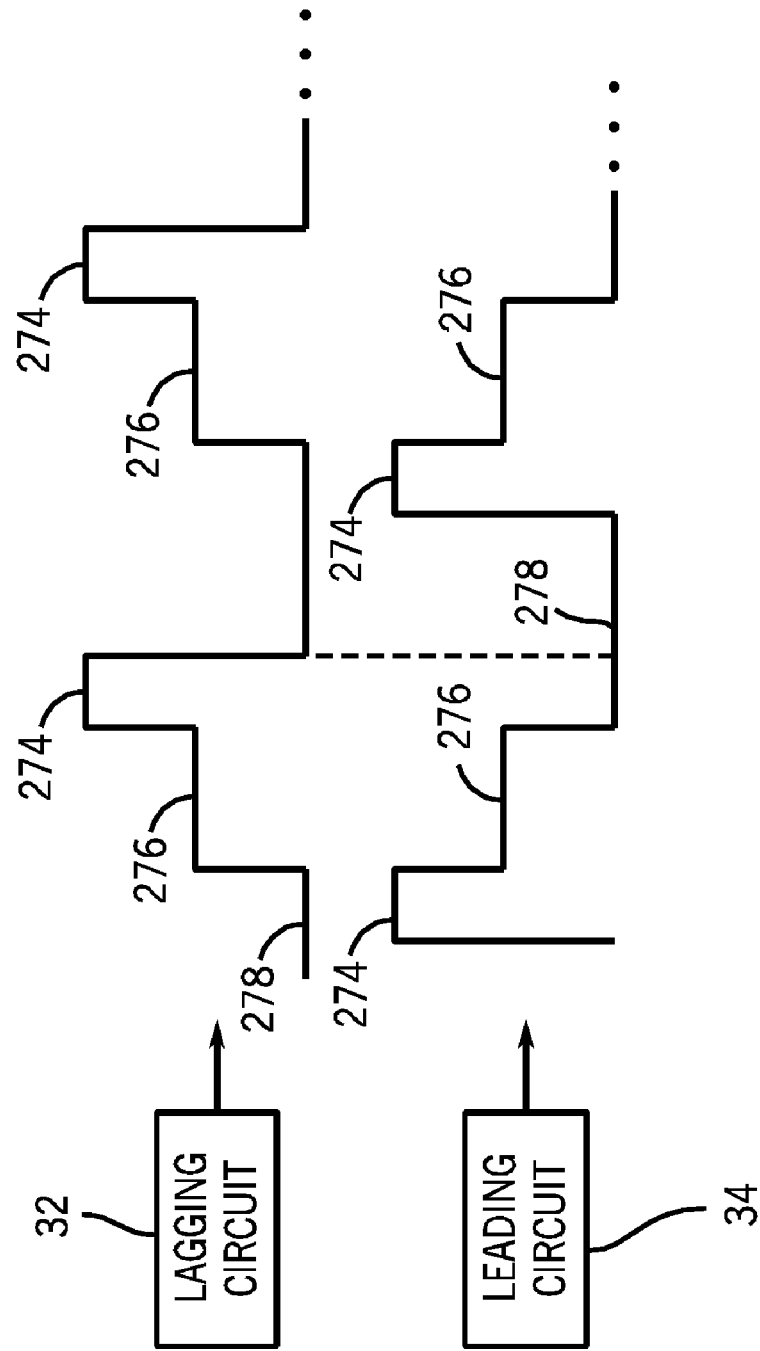
FIG. 15 is a graphical representation of exemplary phase shifts and duty cycles of current waveforms.

As a control method in accordance with present embodiments is implemented, the active states and phase shifts of the converter circuits 32, 34 may be altered, and current flow waveforms may be generated. For a particular phase shift and duty cycle, the exemplary current waveforms shown in FIG. 15 may be generated for an ideal circuit (i.e. a circuit with optimal transformer coupling and so forth). In one embodiment, when either the leading converter circuit 34 or the lagging converter circuit 32 is exclusively on, the respective semiconductor switches, either 66 and 68 or 46 and 48, will carry the full peak current 274, which is dictated by the output current of the combined circuit outputs and the transformer turns ratios, as previously described. The full peak current 274 is effectively the output current multiplied by the transformer turns ratio. During the time when both converter circuits 32, 34 are active, the load output current will split between the two circuits such that each carries approximately half of the peak current 276. The output current multiplied by the turns ratio of the transformer 36 results in each converter circuit 32 or 34 carrying one half of the peak current. During the time when only one converter circuit is active, the other converter circuit will carry no current 1278. When the two converter circuits are fully in phase, such as would occur when operating at a rated load operating point, the currents in the primary switches 66, 68, 46, 48 will be at approximately half of the peak current for the full active portion of the cycle for each inverter circuit.

Figure 16:
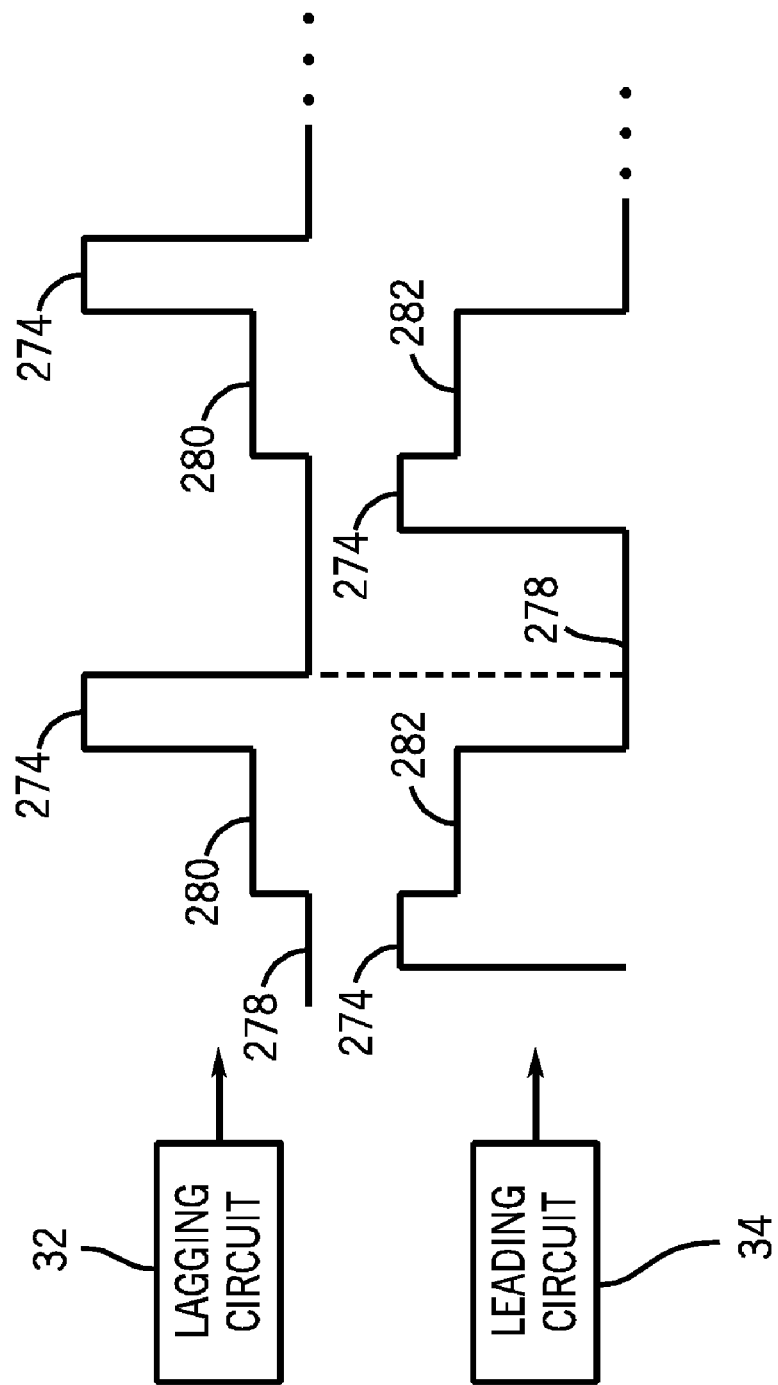
FIG. 16 is a similar graphical representation of exemplary current waveforms.

For a particular phase shift and duty cycle, the exemplary current waveforms shown in FIG. 16 may be generated for a non-ideal circuit (i.e. a circuit with real components). In one embodiment, when either the leading converter circuit 34 or the lagging converter circuit 32 is exclusively on, the respective semiconductor switches, either 66 and 68 or 46 and 48, will carry the full peak current 274, which is dictated by the output current 33 of the combined circuit outputs and the transformer turns ratios, as previously described. During the time when both converter circuits 32, 34 are active, the load output current 280 in the lagging circuit 32 is lower than ideally expected (~50% of the peak current) with respect to FIG. 15. Since the total peak current remains the same with respect to FIG. 15, the leading circuit 34 carries a current 282 that is higher than ideally expected (~50% of the peak current) to compensate for the decrease in current in the lagging circuit 32. During the time when only one converter circuit is active, the other converter circuit will carry no current 278.

This non-ideal sharing occurs because the voltage on the secondary winding 54 of the transformer 50 of the lagging circuit 32 is approximately equal to the voltage on the secondary winding 74 of the transformer 70 that the leading circuit 34 is providing. This voltage reflects to the primary winding 52 of the transformer 50 of the lagging circuit 32 and is nearly equal to the voltage available to drive the lagging circuit 32. Accordingly, there exists very little forcing voltage to overcome the leakage inductance in the transformer 50 of the lagging circuit 32 until the leading circuit 34 enters an inactive state, and the secondary voltage approaches zero. At that point, the full voltage is available to ramp up the current in the primary winding 52 of the transformer 50 of the lagging circuit 32, and it quickly adjusts to carry the full peak current.

For transient, dynamic load conditions, the described mismatch in the current carried by the converter circuits 32, 34 may be insignificant. However, in response to loads of longer durations or for embodiments in which the circuits 32, 34 are arranged in series, it may be desirable to balance the currents carried by the inverter circuits 32, 34 to distribute power losses and heat generated during operation. The mismatch in average current carried by the converter circuits 32, 34 may cause a mismatch in voltages between the converter circuits 32, 34, causing unequal splitting of the total input voltage from the primary power supply 28 when the circuits 32, 34 are connected in a series arrangement. This mismatch in voltage for the series arrangement may cause excess voltage stress on the components of the converter circuits 32, 34. In one embodiment, this voltage mismatch may be compensated for by splitting the overlap time between the two circuits 32, 34 when they are operating in a phase shifted mode. The duty cycles of the leading and/or lagging circuit 34 and/or 32 may be adjusted such that the leading circuit 34 does not carry significantly more average current than the lagging circuit 32. In one embodiment, this adjustment would comprise alternating which converter circuit 32 or 34 is the leading circuit during operation such that the circuit that carries a greater portion of the peak current alternates.

Figure 17:
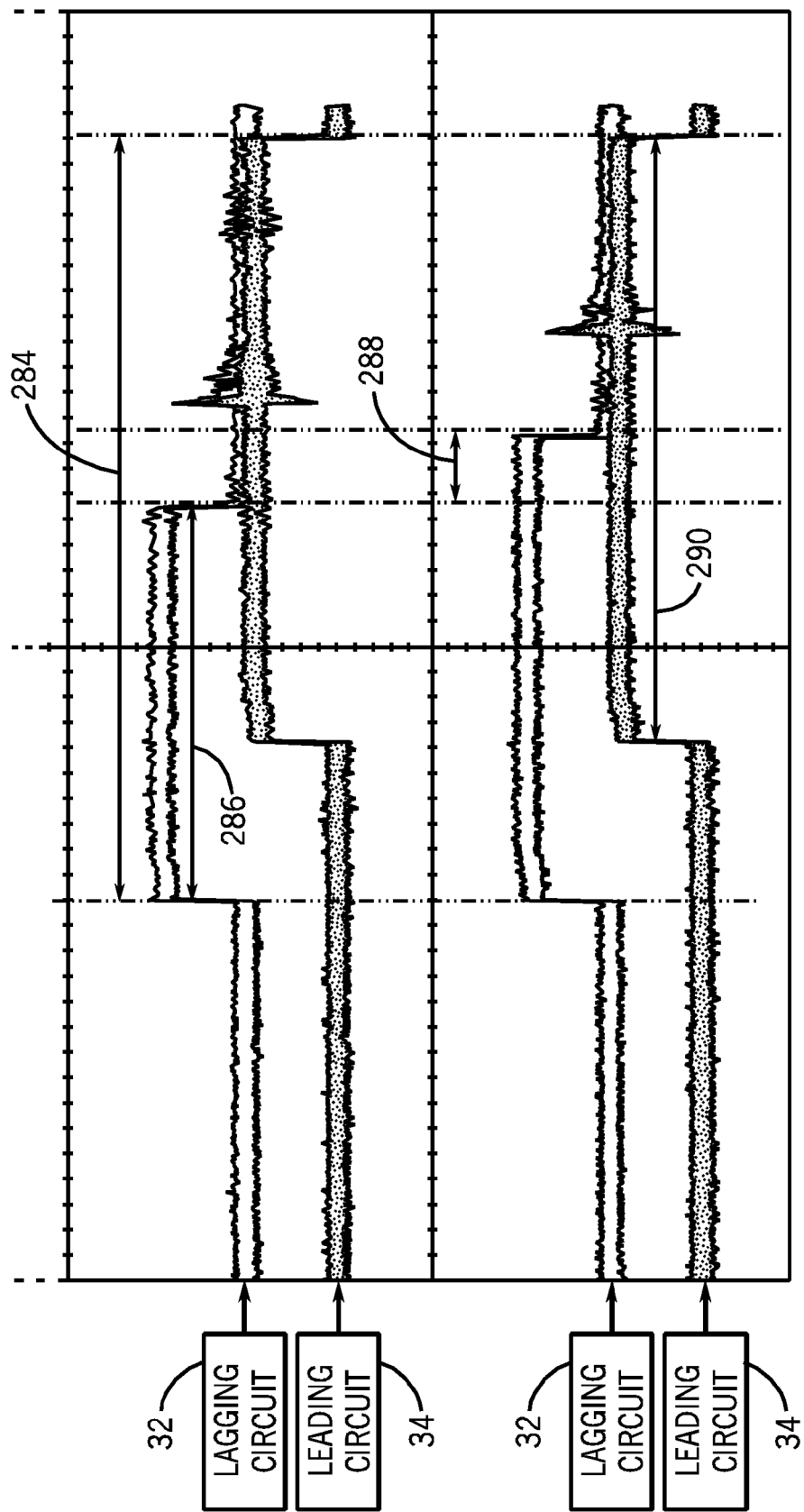
FIG. 17 is a graphical representation of waveforms for lagging and leading circuits.

In another embodiment as illustrated in FIG. 17, information regarding whether the center point of the primary power supply input voltages for each of the circuits 32, 34 is greater or lesser than half of the total supplied primary power supply voltage may be acquired and used to compensate for the mismatch in current carried by the circuits 32, 34. In one embodiment, a comparator circuit may indicate this information and provide it to the controller 244 by a single digital input line. This line may indicate whether the center point is too high or too low for equal current sharing between the two circuits 32, 34. The controller 244 may then signal a duty cycle change in the circuits 32, 34 to correct for the mismatch. FIG. 13 illustrates two sets of waveforms showing the control signals for two different time points. The controlling variable 284 for the voltage output is identical for the two sets of waveforms, indicating that the desired voltage output has been maintained. The waveforms illustrate a larger leading duty cycle 286 and a reduced leading duty cycle 288, indicating that the active time of the lead converter circuit has been modified as required to correct for the unequal split of the primary power supply output voltage. The duty cycle of the lagging circuit remains unchanged 290. Effectively, the duty cycle of the leading converter 34 may be modulated in response to sensed variations in the center point of the primary power supply output voltage. Additionally, it may be necessary or desirable under certain load conditions to modify or modulate the duty cycle of the lagging circuit 32, as a further means of reducing a mismatch in the voltages between the converter circuits 32, 34. Other embodiments may provide multiple signals or other types of signals, such as analog feedback signals indicating the magnitude of the voltages applied to the two converter circuits, to the controller 244. These signals may be used in place of or in addition to the single digital input line described.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A method of dynamically adjusting an output voltage for battery charging operation, comprising:
    setting a phase shift between duty cycles of a pair of forward converter circuits based on a detected battery voltage rating of a battery; and
    adjusting the duty cycles of the pair of forward converter circuits to accommodate changes in a voltage requirement of the battery.

2. The method of claim 1, wherein the upper limit for each of the duty cycles is based on time required for a transformer core in each of the respective forward converter circuits to reset.

3. The method of claim 1, wherein setting the phase shift comprises delaying a leading edge of a pulse in a switching period to reduce the duty cycle of a one of the pair of forward converter circuits.

4. The method of claim 1, comprising preventing saturation of a transformer in one of the pair of forward converter circuits by monitoring voltage and/or current in the transformer and disabling initiation of a new pulse when the voltage and/or current indicates that the transformer has not been reset.

5. The method of claim 1, comprising flowing current through the pair of forward converter circuits in parallel or in series.

6. The method of claim 1, wherein adjusting the duty cycles of the pair of forward converter circuits comprises increasing they duty cycles to accommodate a higher voltage requirement of the battery.

7. The method of claim 1, wherein adjusting circuit components comprises switching one or more transistors in each of the forward converter circuits to pulse width modulate a voltage output of each forward converter circuit.

8. The method of claim 1, comprising ceasing to charge the battery based on reaching a target value of a charging algorithm.

9. A battery charging system, comprising:
    a pair of forward converter circuits capable of coordinating to accommodate a dynamic voltage requirement of a battery; and
    a controller, comprising:
        a regulator capable of receiving at least one input related to a desired combined voltage output for the pair of forward converter circuits based on the dynamic voltage requirement of the battery, and capable of generating a control signal; and a processor capable of receiving the control signal and driving switches in the pair of forward converter circuits to facilitate control of duty cycles of the pair of forward converter circuits based on the control signal to produce the desired combined voltage output.

10. The battery charging system of claim 9, wherein the processor is configured to drive the switches via control of gate drive circuitry.

11. The battery charging system of claim 9, wherein the processor is configured to output an additional control signal for an auxiliary device.

12. The battery charging system of claim 9, wherein regulator is capable of receiving a measured value for an actual output from an output sensor.

13. The battery charging system of claim 9, wherein the processor is capable of shifting the duty cycles of the pair of forward converter circuits based on the control signal to produce the desired combined voltage output.

14. The battery charging system of claim 9, wherein the processor is capable of adjusting a pulse width of the duty cycles of the pair of forward converter circuits based on the control signal to produce the desired combined voltage output.

15. The battery charging system of claim 9, wherein the pair of forward converter circuits are arranged in parallel or in series.

16. A method of accommodating a voltage requirement of a battery charging operation, comprising:

increasing synchronized duty cycles in a pair of forward converter circuits to accommodate an increase in a battery charge state of the battery; and changing a phase shift between the duty cycles upon reaching an upper limit for each of the duty cycles to accommodate a further increase in the battery charge state.

17. The method of claim 16, wherein changing the phase shift comprises delaying a leading edge of a pulse in a switching period to reduce the duty cycle of a one of the pair of forward converter circuits.

18. The method of claim 16, wherein changing the phase shift comprises initiating an early lagging edge of a pulse in a switching period to reduce the duty cycle of a one of the pair of forward converter circuits.

19. The method of claim 16, wherein changing the phase shift comprises skipping a pulse in a switching period of a one of the pair of forward converter circuits.

20. The method of claim 16, wherein changing the phase shift comprises increasing the duty cycles to a maximum limit, shifting outputs of the pair of forward converter circuits fully out of phase, and reducing pulse widths in the switching period for each of the forward converter circuits.

* * * * *